US009640910B1

(12) United States Patent
Chien et al.

(10) Patent No.: US 9,640,910 B1
(45) Date of Patent: May 2, 2017

(54) APPARATUS FOR SECURING CONNECTION BETWEEN CABLE ASSEMBLY AND STORAGE DEVICE CONNECTOR

(71) Applicant: Dell Products L.P., Round Rock, TX (US)

(72) Inventors: Tung Yu Chien, New Taipei (TW); Chi Chang Fu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/143,901

(22) Filed: May 2, 2016

(51) Int. Cl.
| | |
|---|---|
| H01R 13/627 | (2006.01) |
| H01R 13/639 | (2006.01) |
| H01R 27/02 | (2006.01) |
| H01R 12/79 | (2011.01) |
| H01R 12/72 | (2011.01) |
| G06F 13/16 | (2006.01) |
| G06F 13/40 | (2006.01) |

(52) U.S. Cl.
CPC ....... H01R 13/639 (2013.01); G06F 13/1678 (2013.01); G06F 13/409 (2013.01); H01R 12/722 (2013.01); H01R 12/79 (2013.01); H01R 27/02 (2013.01)

(58) Field of Classification Search
CPC ............ H01R 13/6275; H01R 13/6272; H01R 13/6273; H01R 13/506; H01R 13/639; H01R 23/7073
USPC ........................................ 439/357, 358, 660
See application file for complete search history.

(56) References Cited

U.S. PATENT DOCUMENTS

| | | | | |
|---|---|---|---|---|
| 5,234,357 A | * | 8/1993 | Yamaguchi .......... | H01R 13/639 439/354 |
| 5,277,627 A | * | 1/1994 | Matsuzaki ............ | H01R 23/10 439/353 |
| 5,638,474 A | | 6/1997 | Lampert | |
| 6,056,579 A | * | 5/2000 | Richards, III ..... | H01R 12/7005 439/327 |
| 6,808,407 B1 | | 10/2004 | Cannon | |
| 6,939,165 B1 | | 9/2005 | Wu | |
| 7,901,250 B2 | | 3/2011 | Lam | |
| 8,961,217 B2 | * | 2/2015 | Dang ................. | H01R 13/6275 439/358 |
| 2011/0090633 A1 | | 4/2011 | Rabinovitz | |
| 2011/0305419 A1 | | 12/2011 | Kline | |

* cited by examiner

*Primary Examiner* — Hien Vu
(74) *Attorney, Agent, or Firm* — Jackson Walker L.L.P.

(57) ABSTRACT

A disclosed connector latch for latching a cable assembly to a connector includes a substantially planar body and has a width approximately equal to the cable assembly width. The connector latch includes a retention clip comprising first and second tabs. Each tab extends the latch body and terminates at a flange displaced above the latch body by a thickness of the cable assembly. The connector latch includes a clamp with first and second branches. Each branch includes a middle portion pivotally coupled to the latch body, a fang at a distal end of each branch, and pinch plates at a proximal end of each branch. The branches are configured with an unbiased state in which they engage a distal edge of a connector connected to the cable. The mass storage device may be an M.2 solid state drive and the device connector may be a serial ATA connector.

16 Claims, 9 Drawing Sheets

APPARATUS FOR SECURING CONNECTION BETWEEN CABLE ASSEMBLY AND STORAGE DEVICE CONNECTOR

TECHNICAL FIELD

The present disclosure relates to information handling systems. More specifically, disclosed embodiments provide systems and methods for securing a cable assembly coupled to a device connector.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems frequently include a motherboard on which one or more processors, e.g., central processing units, general purpose microprocessors, etc., are attached. The motherboard generally includes one or more connectors for coupling one or more persistent mass storage devices to the one or more processors.

A Serial ATA (SATA) hard disk drive is an example of an industry standard persistent mass storage device. An information handling system that employs SATA drives may have a motherboard that includes one or more SATA-compliant connectors integrated on the motherboard. At least one embodiment of a SATA connector, referred to herein as a latchless connector, does not have any latching elements or features to maintain the data storage device in secure connection with the connector.

While latchless connectors are highly functional with respect to SATA hard disk drives, the absence of latching features may result in connections that are loose, unstable, or otherwise unreliable when used in conjunction with other types of storage devices.

SUMMARY

In accordance with the teachings of the present disclosure, disadvantages and problems associated with traditional approaches to connecting data storage devices to a device connector are substantially reduced or eliminated.

In accordance with embodiments of the present disclosure, a connector latch suitable for securing a connection between a cable assembly and a device connector includes a latch body, a retention clip, and a clamp referred to herein as a biased clamp.

The latch body may be substantially planar and may include a rectangular central portion. A width of the latch body may equal or closely approximate a corresponding width of the cable assembly to be latched. The latch body may further include triangular structures, referred to herein as cat ear structures, including a first ear extending from the body core at the first end of the latch body and a second ear extending from the body core at the second end of the latch body. In at least one embodiment, the latch body may be sized to accommodate a cable assembly suitable for coupling to an SATA connector.

The retention clip may include a pair of tabs located on opposite ends of the latch body. Each tab may extend perpendicularly from a plane of the latch body. Each tab may terminate at a flange that is parallel to and displaced from or above the latch body by a distance approximately equal to a thickness of the cable assembly. In this manner, the retention tabs may maintain a cable assembly in contact with the latch body.

The clamp may include a pair of opposing arms or branches. Each branch may include a middle portion that is pivotally coupled to a corresponding pivot point of a latch body, a fang at a distal end of the each branch, and a pinch plate at a proximal end of each branch. The first and second branches may be sized and oriented to occupy or exhibit an engaged state when no force or bias is applied to the latch. In the engaged state, the fangs at the distal ends of the two branches engage a far edge of a motherboard I/O connector, e.g., an SATA connector. When the latch is biased by squeezing or otherwise forcing the pinch plates together or towards each other, the branches rotate around the pivot points and away from the engaged position such that the latch no longer engages the far end of the motherboard I/O connector.

Each of the branches may include a comparatively small stem connected between the pivot point and the middle point of the branch. The stem may cause the distal end fangs to rotate through a greater angular displacement than the pinch plates so that only a small displacement of the pinch plates is needed to "open" or "unlock" that latch. Each of the branches may include an L-shaped portion connected between the middle portion and an edge of the first pinch plate.

Technical advantages of the present disclosure may be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-8, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network data storage device, or any other suitable device and may vary in size, shape, performance, functionality, and price. The information handling system may include memory, one or more processing resources such as a central processing unit (CPU) or hardware or software control logic. Additional components of the information handling system may include one or more data storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
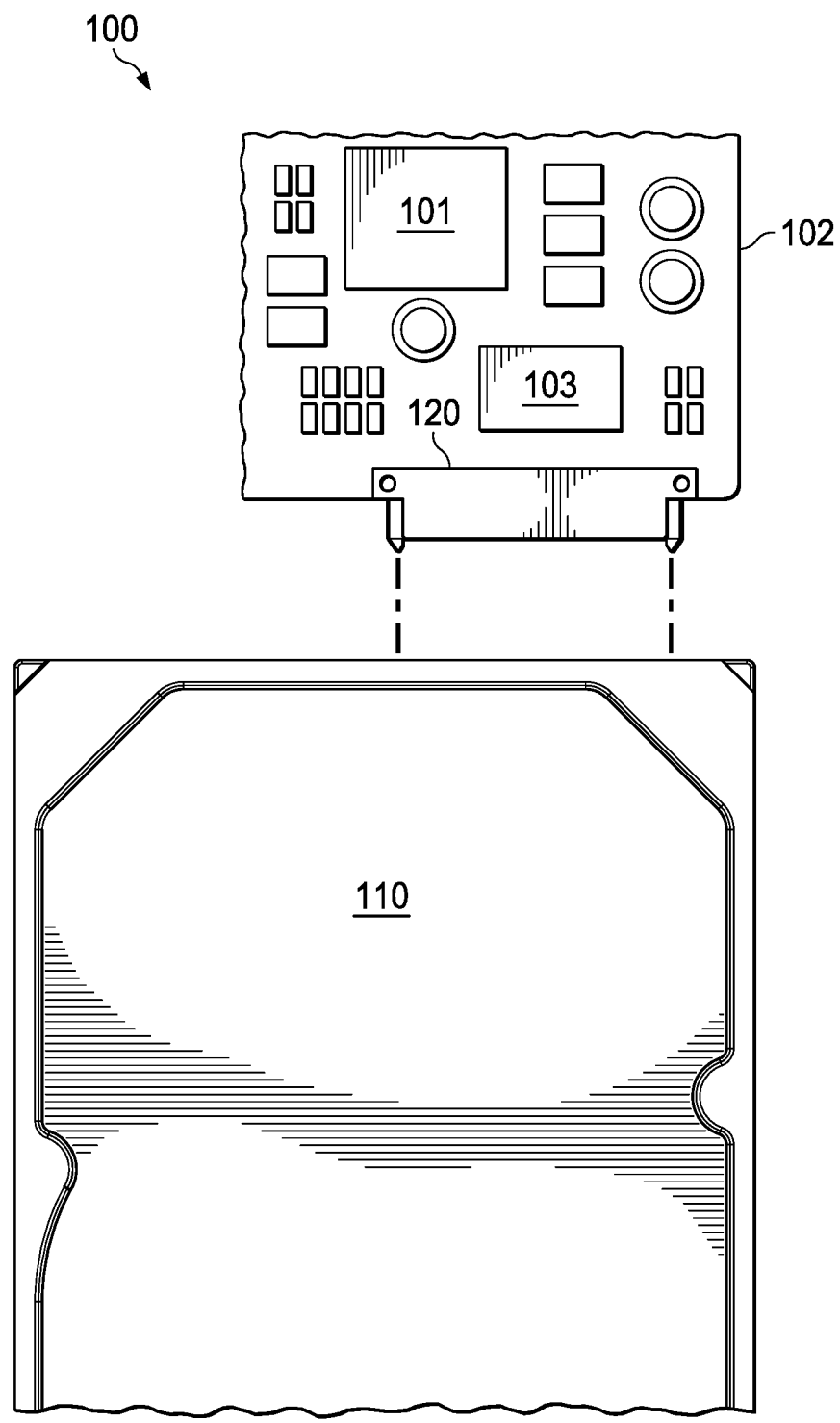
FIG. 1 illustrates a motherboard and a data storage device of an information handling system.

FIG. 1 illustrates elements of an information handling system 100. The information handling system 100 illustrated in FIG. 1 includes a motherboard 102 on which central processing unit (CPU) 101 is coupled to a chip set device 103. The chip set device 103 of FIG. 1 includes an interface for connecting to motherboard I/O connector 120. FIG. 1 further illustrates a data storage device 110 which may be coupled to motherboard 102 via motherboard I/O connector 120. References to data storage devices may refer specifically to non-volatile, random access, mass storage devices including, as two prominent but non-limiting examples, a magnetic hard disk drive (HDD) and a solid state drive (SSD).

In at least one embodiment, motherboard I/O connector 120 is a serial ATA (SATA) connector and the illustrated data storage device 110 may represent a conventional SATA HDD. It should be appreciated however, that subject matter disclosed herein is applicable to devices and device connectors generally and not just to data storage devices and connectors. Similarly, disclosed subject matter may apply to interface protocols other than SATA. In general, disclosed subject matter addresses any device-connector interface that lacks means to restrain or resist separation of the device and the connector.

Figure 2:
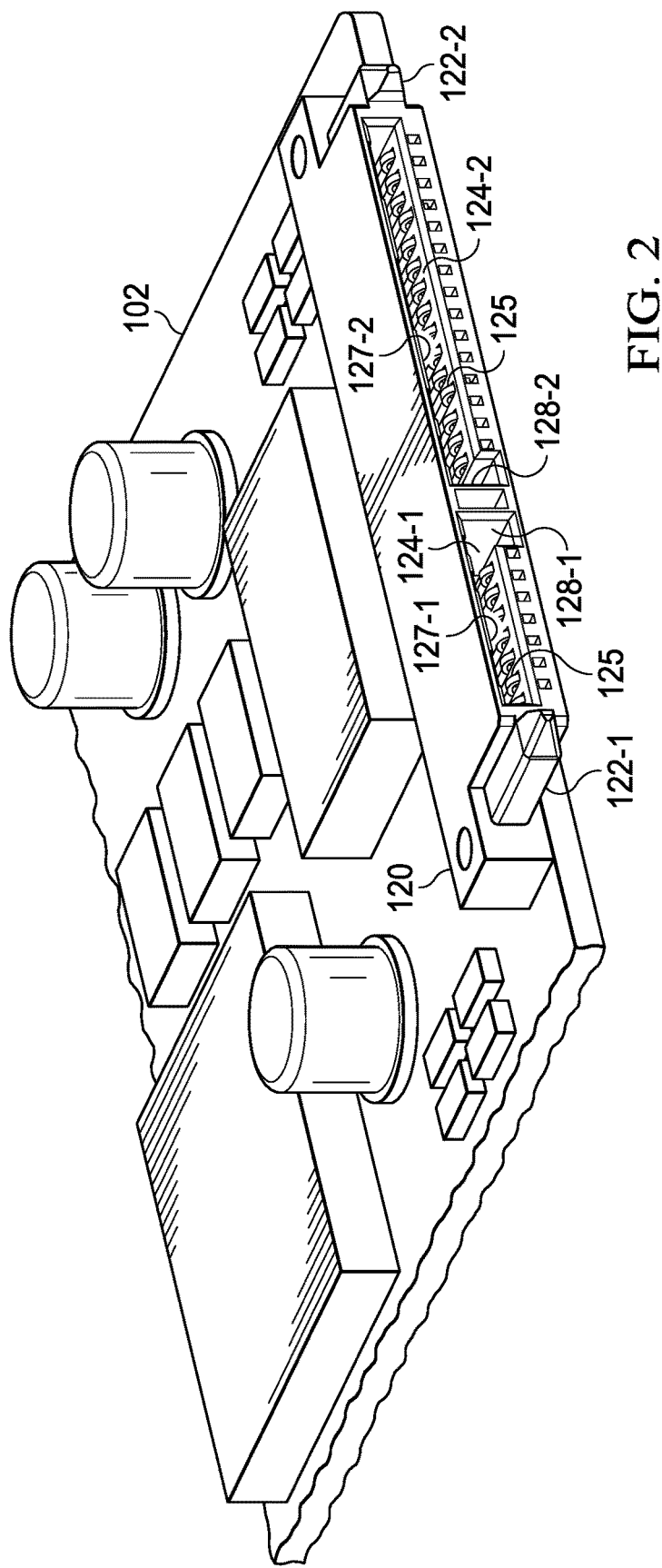
FIG. 2 illustrates an I/O connector of the motherboard of FIG. 1 in perspective view with the data storage device removed from view.

FIG. 2 illustrates motherboard I/O connector 120 in perspective view with no storage device connected. The motherboard I/O connector 120 illustrated in FIG. 2 includes first and second guideposts 122-1 and 122-2 to facilitate the receiving and aligning of a complementary connector. The motherboard I/O connector 120 of FIG. 2 defines first and second slots 124-1 and 124-2, each of which includes a set of interconnect pins 125. The position and shape of slots 124 defines the position and shape of complementary elements of a connector to which motherboard I/O connector 120 may be connected. The slots 124 illustrated in FIG. 2 are asymmetrically configured such that a complementary set of connector blades (not depicted in FIG. 2) will align with slots 124 of motherboard I/O connector 120 in only one orientation.

The first slot 124-1 illustrated in FIG. 2 includes a horizontal portion 127-1 and a vertical portion 128-1 extending perpendicular to horizontal portion 127-1 from an interior end of horizontal portion 127-1. The second slot 124-2 illustrated in FIG. 2 includes a horizontal portion 127-2 and a vertical portion 128-2 extending perpendicular to horizontal portion 127-2 from an interior end of horizontal portion 127-2.

Other embodiments of device connectors 120 may include more or fewer slots 124, slots of different shapes than slots 124 and slots in different positions than the slots 124. The slots 124 may comprise SATA compliant slots having a location, size, and shape in compliance with an SATA interconnect standard. Other embodiments of slots 124 may comply with a different interconnect standard.

Those of ordinary skill in the field of interconnects and interconnect standards will readily appreciate that, although motherboard I/O connector 120 includes elements that facilitate a properly aligned connection with a complementary connector, motherboard I/O connector 120 lacks any element or mechanism for preventing the two connectors, once connected, from subsequently separating or otherwise becoming disconnected.

Figure 3A:
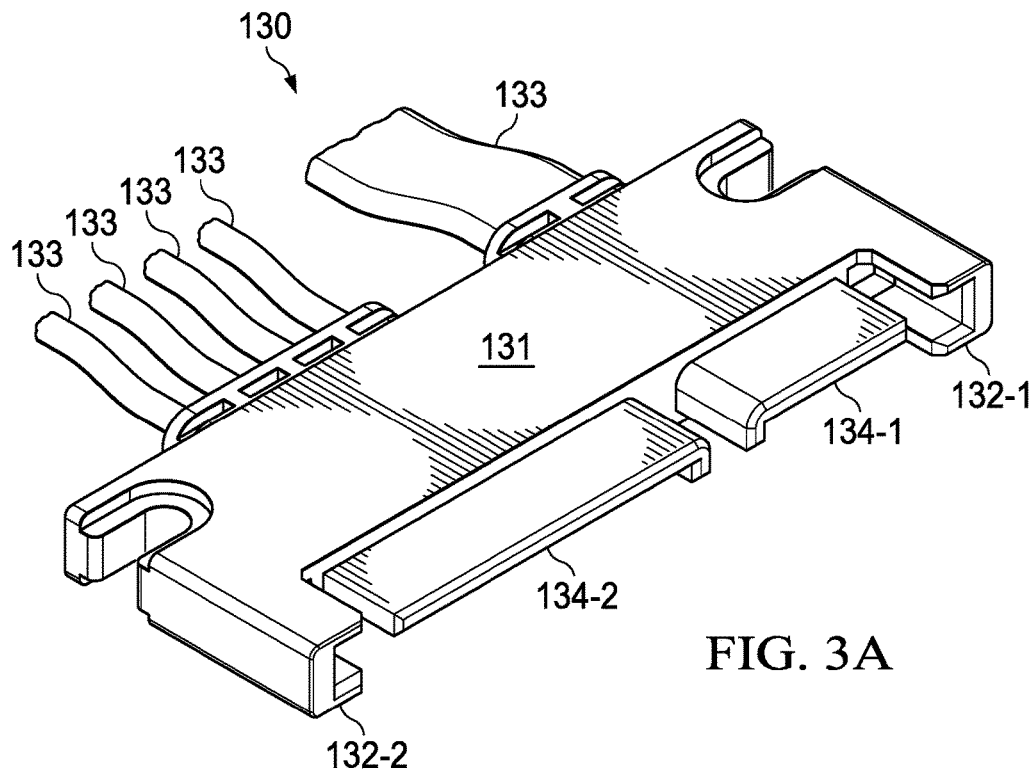
FIG. 3A and FIG. 3B illustrate a cable assembly for connecting an alternative data storage device to the I/O connector of FIG. 1.
Figure 3B:
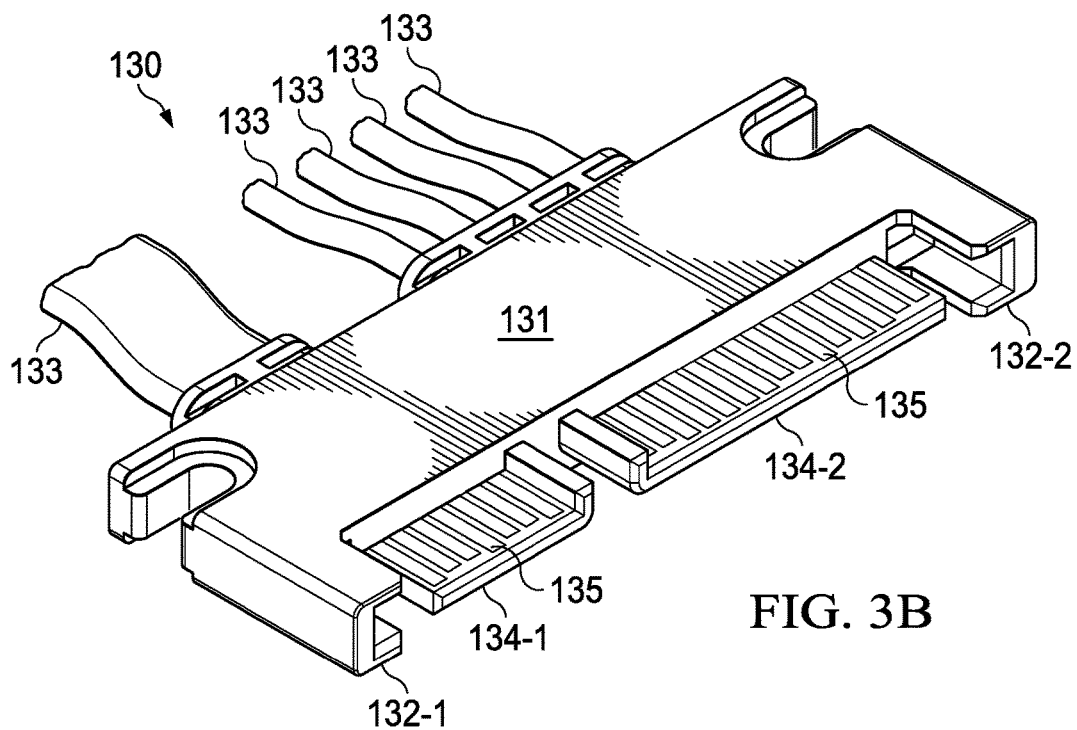

FIG. 3A and FIG. 3B illustrate two perspective views of a cable assembly 130 suitable for connecting to motherboard I/O connector 120. The cable assembly 130 illustrated in FIG. 3A and FIG. 3B includes a frame 131 that receives cables 133 and routes signals carried via each cable 133 to one or more electrically conductive fingers 135 on one or more blades 134.

The frame 131 illustrated in FIG. 3A and FIG. 3B includes first and second blades posts 132-1 and 132-2 that align with the guide posts 122-1 and 122-2 of motherboard I/O connector 120. The blades 134 of the cable assembly 130 illustrated in FIG. 3A and FIG. 3B are positioned, shaped, and sized to complement slots 124 of the motherboard I/O connector 120 in FIG. 2 so that blades 134 may be received within slots 124 with connector pins 125 in electrical contact with corresponding fingers 135 when motherboard I/O connector 120 and cable assembly 130 are properly connected.

Figure 4B:
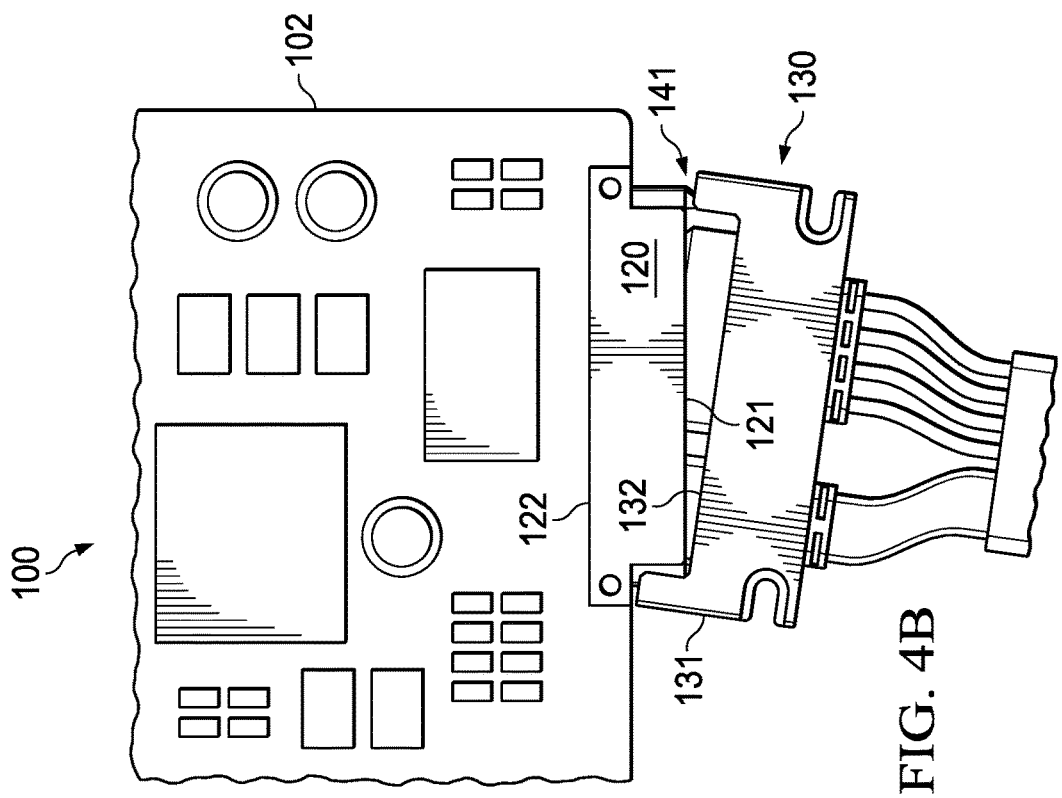
FIG. 4B illustrates an unintended or inadvertent disconnection between the cable assembly and the I/O connector.
Figure 4A:
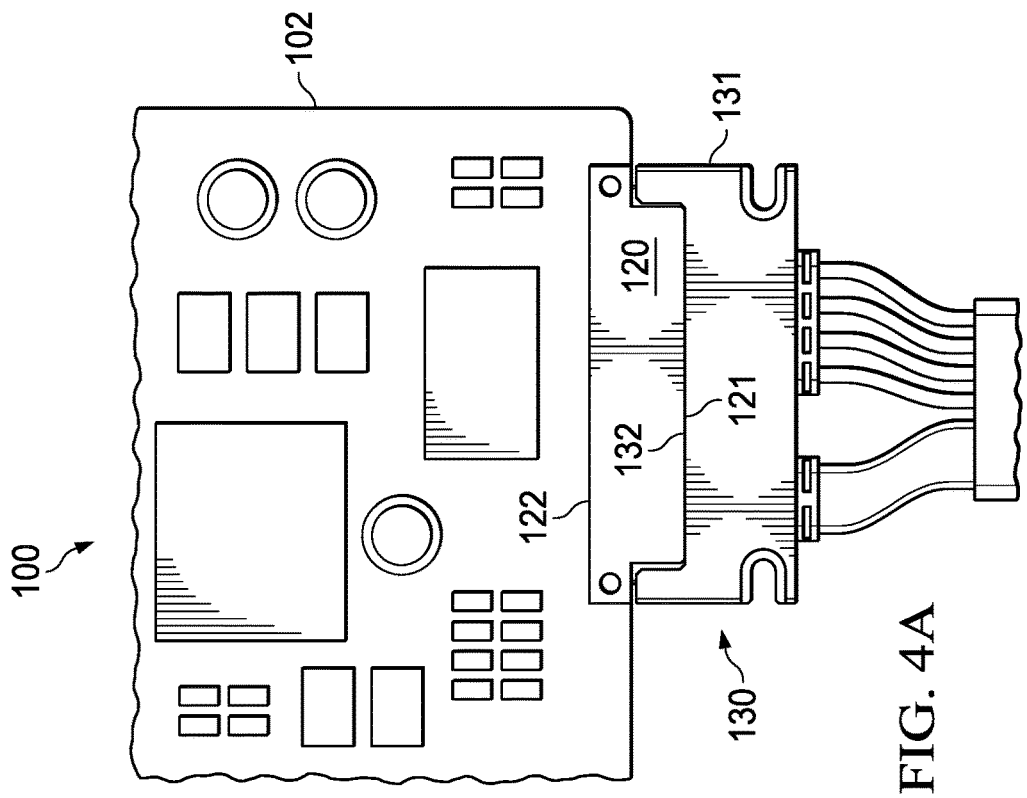
FIG. 4A illustrates the cable assembly of FIG. 3A and FIG. 3B connected to the I/O connector of FIG. 1.

FIG. 4A illustrates cable assembly 130 connected to motherboard I/O connector 120 wherein a front edge 121 of motherboard I/O connector 120 is in contact with a front edge 132 of frame 131. A back edge 122 of motherboard I/O connector 120 is shown in FIG. 4A for later reference. As suggested in the description of FIG. 2, the lack of a mechanism to prevent separation of motherboard I/O connector 120 and cable assembly 130 may result in the inadvertent disconnection of motherboard I/O connector 120 and cable assembly 130. FIG. 4B illustrates an inadvertent disconnection 141 of motherboard I/O connector 120 and cable assembly 130. The disconnection 141 illustrated in FIG. 4B is an example of a partial disconnection, in which cable assembly 130 is physically detached from motherboard I/O connector 120 at one end while remaining connected at an opposite end. Although FIG. 4B illustrates disconnection 141 as a partial disconnection, motherboard I/O connector 120 and cable assembly 130 may become entirely disconnected in other instances.

Disconnection 141 results in an unintended and undesirable fault condition in a data storage device (not depicted in FIG. 4A or FIG. 4B) in which the data storage device becomes inaccessible or transmits one or more incorrect or invalid signals to a processor or other device on motherboard 102 until motherboard I/O connector 120 and cable assembly 130 are re-connected. In at least one embodiment, a disclosed connector latch beneficially maintains motherboard I/O connector 120 and cable assembly 130 in contact with one another without impacting the design of either motherboard I/O connector 120 or cable assembly 130.

Figure 5A:
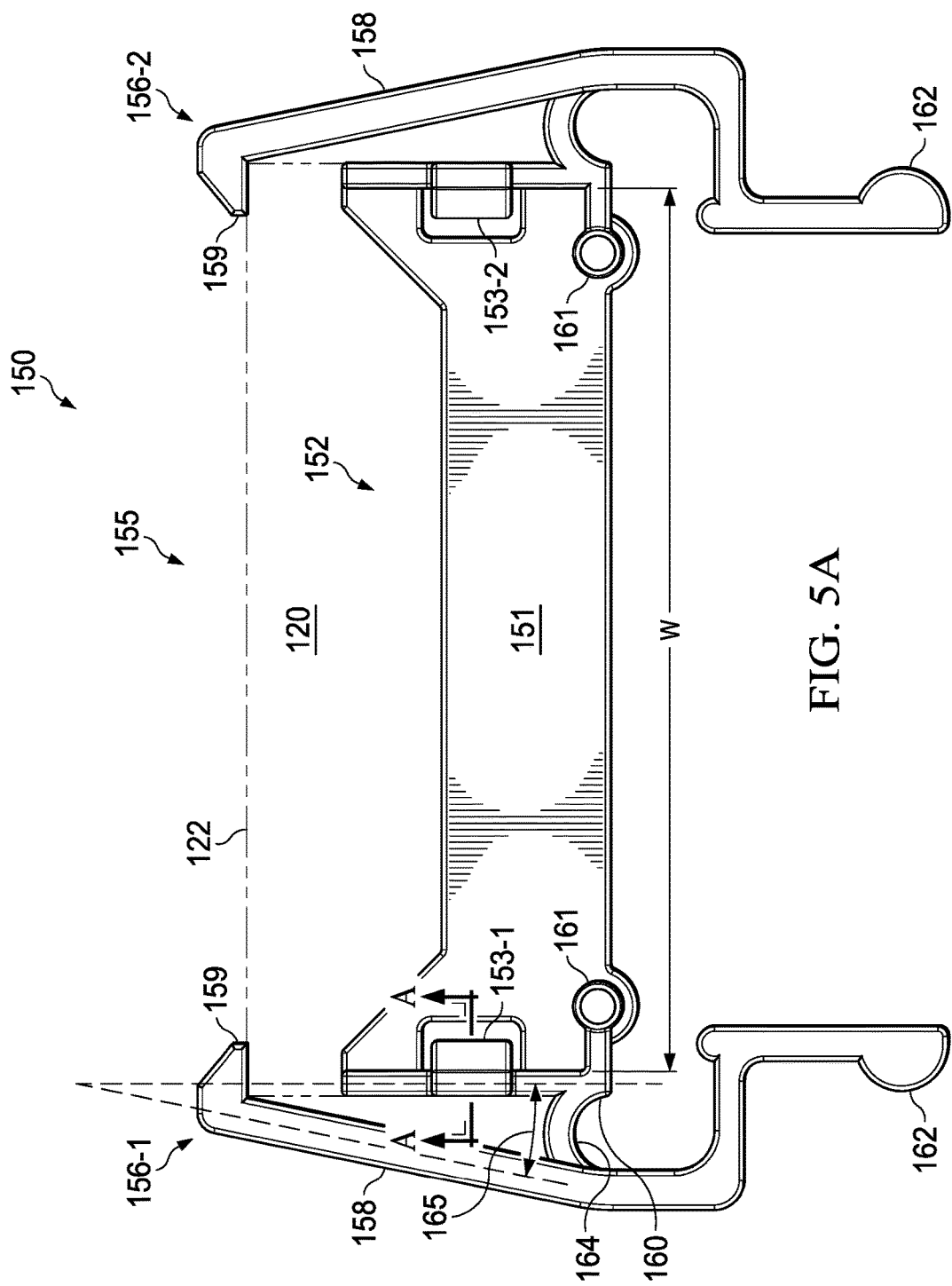
FIG. 5A and FIG. 5B illustrate perspective views of a connector latch.
Figure 5B:
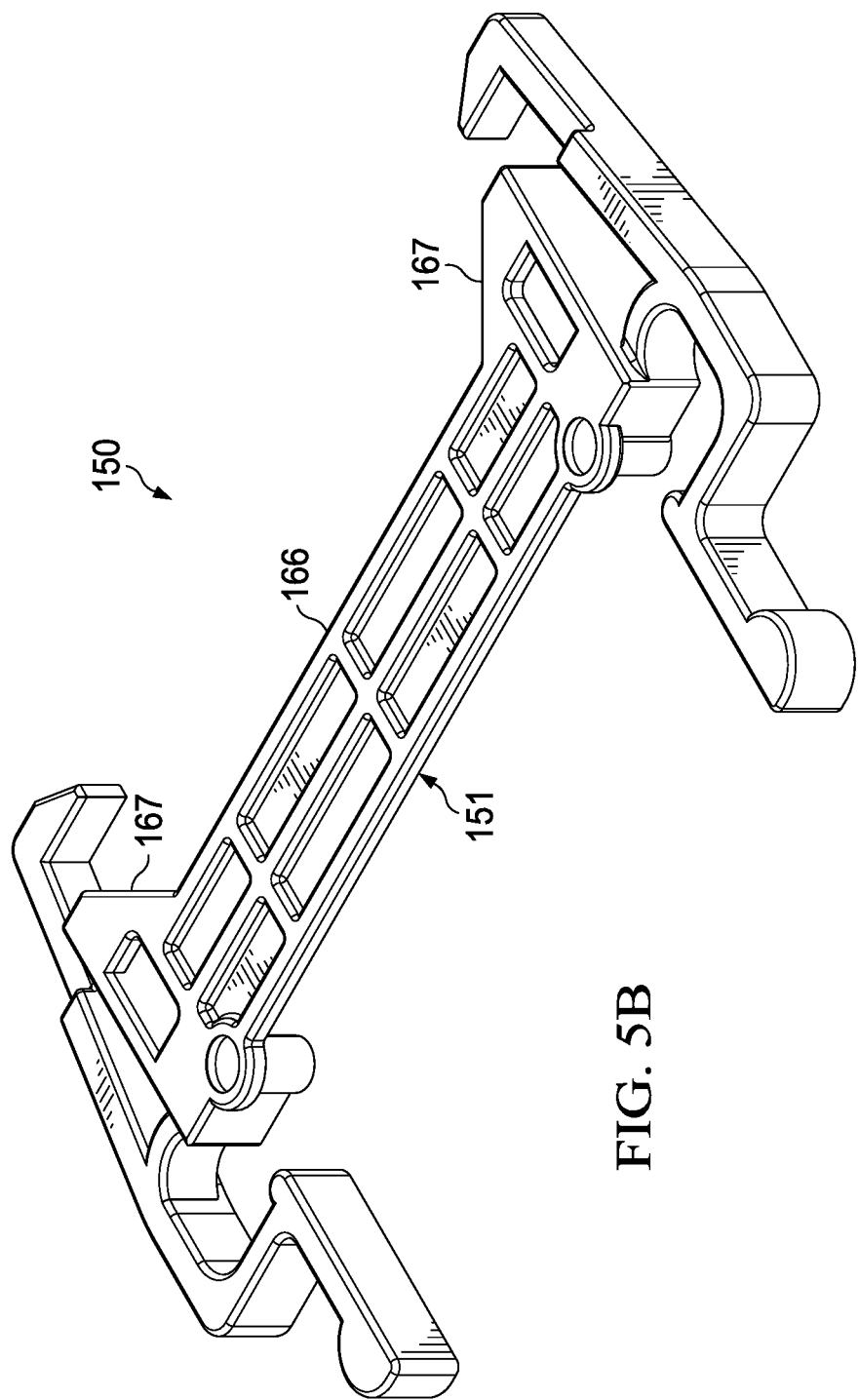
Figure 6:
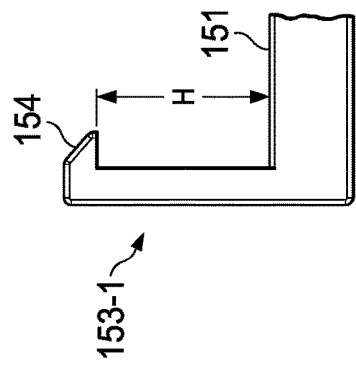
FIG. 6 is a cross sectional view taken along the section line A-A of FIG. 5A.

FIG. 5A and FIG. 5B are perspective views of opposite faces of a connector latch 150 in accordance with disclosed teachings. FIG. 6 is a sectional view of FIG. 5A taken along section line A-A. The connector latch 150 illustrated in FIG. 5B and FIG. 5B includes a substantially planar latch body 151 wherein a width (W) of latch body 151 accommodates a width of the cable assembly frame 131 (FIG. 3A).

The connector latch 150 of FIG. 5A includes a retention clip 152 that includes a first tab 153-1 at a first lateral end of latch body 151 and a second tab 153-2 at a second lateral end of latch body 151. As depicted in FIG. 6, each tab 153 extends substantially perpendicular from latch body 151 and terminates in a flange 154 displaced from latch body 151 by a displacement H, where H is equal to or substantially equal to a thickness of the frame 131.

The connector latch 150 illustrated in FIG. 5A further includes a clamp 155 that includes a pair of branches 156-1 and 156-2. Each branch 156 illustrated in FIG. 5A includes a middle portion 158 pivotally coupled to a pivot point 160. Terminal ends of the branches 156 of FIG. 5A terminate in a pair of opposing fangs 159. A proximal end of each branch 156 illustrated in FIG. 5A forms a pinch plate 162. The pair of pinch plates 162 may be squeezed or pinched together to "open" clamp 155 by the opposing rotations of branches 156 about their respective pivot points 160.

The branches 156-1 and 156-2 illustrated in FIG. 5a are sized and oriented to engage, when unbiased, a back edge 122 of a motherboard I/O connector 120 (shown in dashed line) when connector latch 150 is attached to a cable assembly 130 and the cable assembly 130 is connected to motherboard I/O connector 120. When clamp 155 is biased by a user squeezing or pinching the pinch plates 162 towards each other, fangs 159 rotate about pivot point 160 in opposing directions to disengage back edge 122 of motherboard I/O connector 120. The branches 156 illustrated in FIG. 5A include a stem 164 that extends between pivot point 160 and middle portion 158. The stem 164 displaces midpoint 158 sufficiently from a lateral edge of latch body 151 wherein branch 156 lies substantially along a line that forms an acute angle 165 relative to a lateral edged for latch body 151. The orientation of branch 156 results in a fang 159 that engages edge 122 with no force applied to pinch plates 162.

The branches 156 illustrated include an L-shaped member coupling midpoint 158 to pinch plate 162. The L-shaped structure is oriented to reduce the displacement between pinch plates 162 and to constrain the overall lateral dimension of the assembly as shown.

Due to the angled orientation of first and second branches 156-1 and 156-2, the first and second fangs 159 are closer together than the middle portions 158 when the claim is unbiased, i.e., no force applied to the pinch plates 162. Similarly, the orientation of the L-shaped member results in a displacement between the pinch plates 162 that is less than a displacement between the middle portions 158. As illustrated in FIG. 5A, the unbiased displacement between the pinch plates 162 is equal or approximately equal to the unbiased displacement between fangs 159. In other embodiments, the unbiased displacement between the fangs 159 may be greater than or less than the unbiased displacement between the pinch plates 162.

The latch body 151 shown in FIG. 5B includes a substantially rectangular body core 167 to which a pair of triangular "cat ear" structures 166 extending from upper boundaries of the body core at opposing lateral ends of the body core 166. The latch body 151 and the branches 156 may be sized to engage an SATA motherboard I/O connector 120 when a cable assembly 130 is connected to the motherboard I/O connector 120. In these embodiments, the cable assembly 130 may connect to a form or type of data storage device other than an SATA HDD. For example, a cable assembly 130 may connect an M.2 PCIe SSD to motherboard I/O connector 120 and, in these embodiments, the connector latch 150 may beneficially maintain cable assembly 130 in contact with motherboard I/O connector 120 during system operation without modification. The latch body 151 illustrated in FIG. 5A includes alignment structures 161 to facilitate proper alignment when connector latch 150 is attached to a cable assembly (see FIG. 7A).

Although depicted as fixed-size elements in the illustrated examples, embodiments of connector latch 150 may support adjustable size elements that determine various dimensions of connector latch 150. As non-limiting examples, a width and height of latch body 151 may be adjustable to accommodate different sizes of cable assembly 130 and/or motherboard I/O connector 120. Similarly, each branch 156 may be extendible to adjust the displacement from midpoint 158 to fang 159. Connector latch 150 may be made of a plastic, hard rubber, or other suitable material that has sufficient rigidity as well as sufficient flexibility to enable tabs 153 of retention clip 152 to deflect sufficiently to receive a cable assembly 130 and to enable arms 156 to rotate sufficiently around pivot point 160 to engage a motherboard I/O connector 120.

Figure 7A:
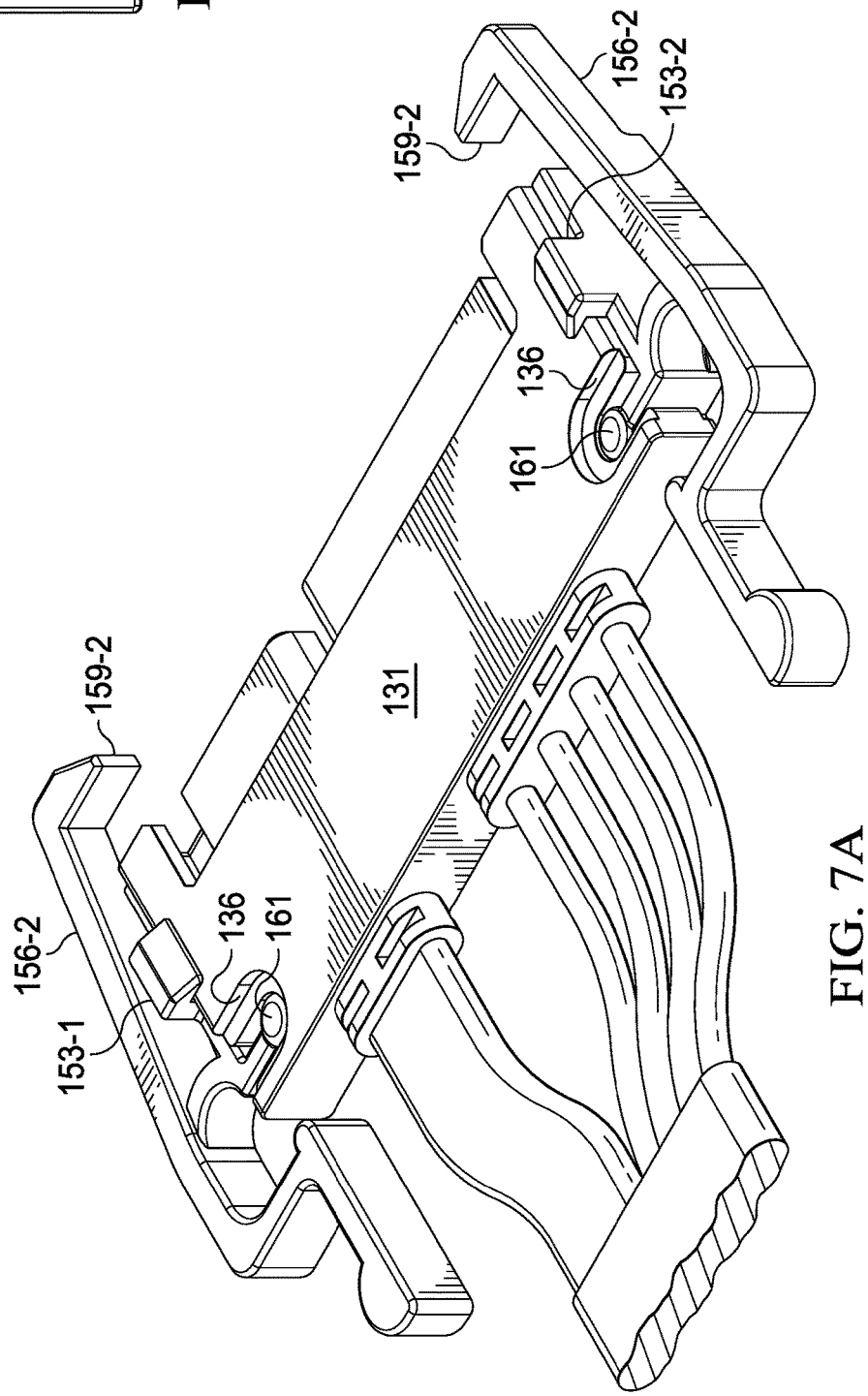
FIG. 7A and FIG. 7B illustrate a connector latch attached to a cable assembly.
Figure 7B:
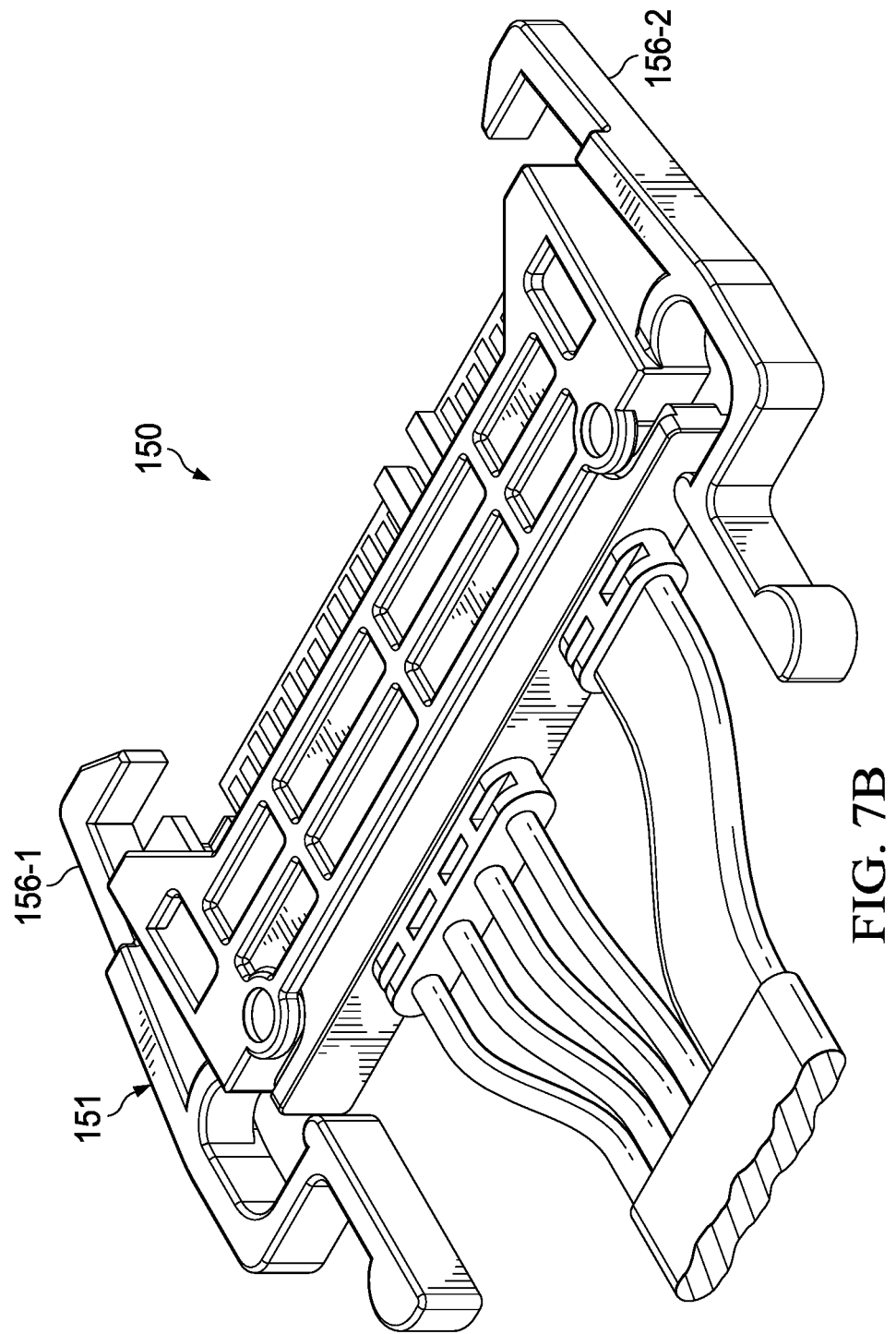

FIGS. 7A and 7B illustrate perspective views of a cable assembly 130 attached to a connector latch 150. FIG. 7A illustrates retention clip tabs 153 engaging frame 131 and the fangs 159 of each branch 156 of connector latch 150 extending to a position suitable for engaging a far edge of a motherboard I/O connector 120 when the combined apparatus is connected to a motherboard I/O connector 120. FIG. 7A further illustrates that, in the depicted embodiment, circular alignment structures 161 on latch body 151 align to corresponding alignment notches 136 formed in cable assembly frame 131.

Figure 8:
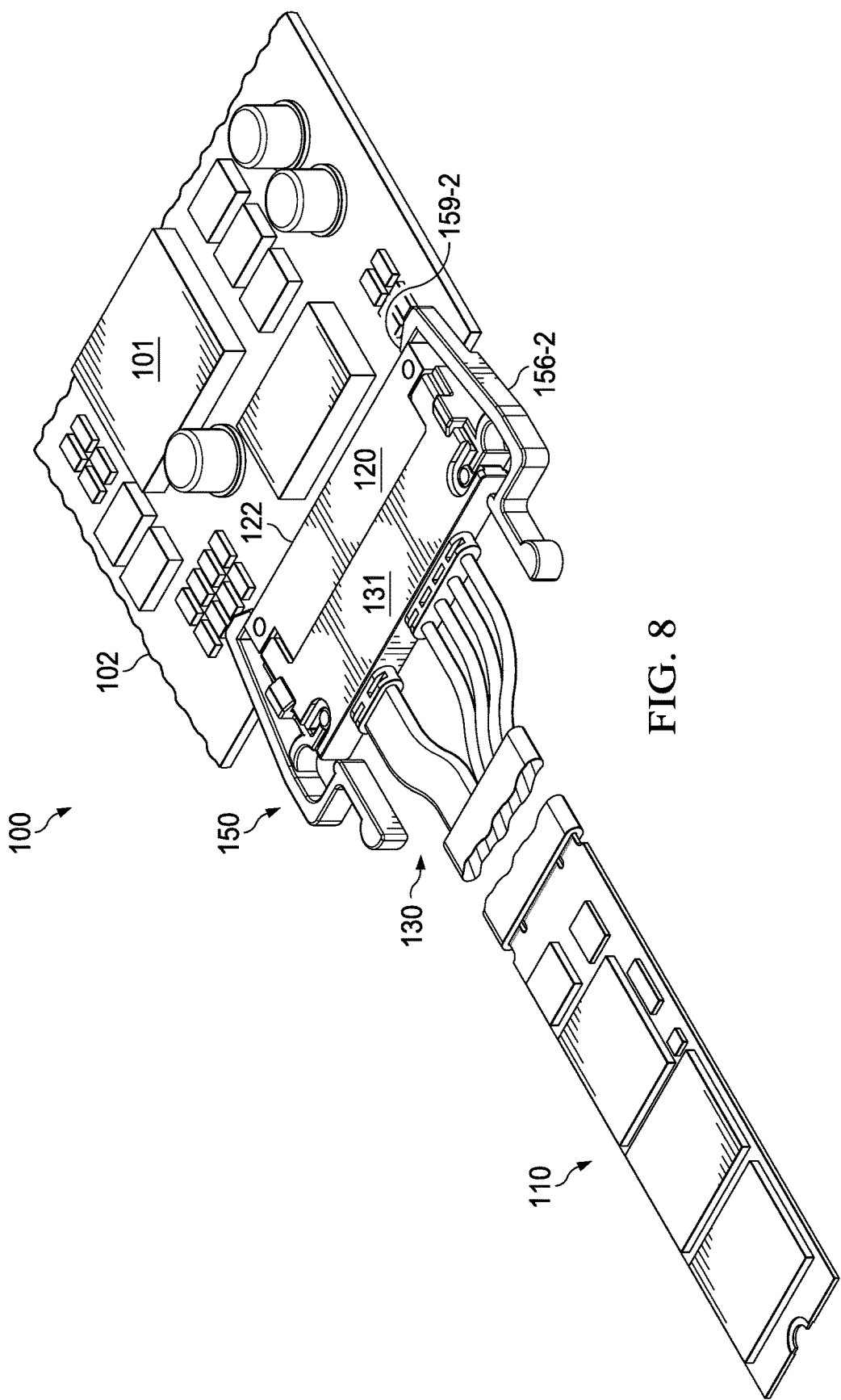
FIG. 8 illustrates the cable assembly and connector latch connected to a device connector in accordance with disclosed teachings.

FIG. 8 depicts the combined apparatus of FIGS. 7A and 7B connected to a motherboard I/O connector 120 on a motherboard 102. FIG. 8 particularly illustrates fangs 159 of branches 156 of connector latch 150 engaging a far edge 122 of motherboard I/O connector 120 while frame 131 of cable assembly 130 is retained in contact with motherboard I/O connector 120.

In this manner, the large installed base of systems employing with SATA device connectors analogous to motherboard I/O connector 120 may be employed with smaller and faster storage devices including, as one non-limiting example, M.2 PCIe SSDs without modifying either the motherboard I/O connector 120 in the system or the cable assembly 130 for connecting the storage device. FIG. 8 illustrates data storage device 110 comprising an M.2 PCIe SSD 108, which is coupled to a CPU 101 on motherboard 102 via cable assembly 130 and motherboard I/O connector 120.

Although the present disclosure has been described in detail, it should be understood that various changes, substitutions, and alterations can be made hereto without departing from the spirit and the scope of the disclosure as defined by the appended claims.

What is claimed is:

1. A connector latch for maintaining a connection between a cable assembly and a motherboard I/O connector, the connector latch comprising:
   a substantially planar latch body wherein a width of the latch body accommodates a width of the cable assembly;
   a retention clip comprising:
      a first tab at a first end of the latch body, extending perpendicularly from the latch body and terminating in a first flange displaced from the latch body by a tab displacement approximately equal to a thickness of the cable assembly; and
      a second tab at a second end of the latch body, extending perpendicularly from the latch body and terminating in a second flange displaced from the latch body by the tab displacement; and
   a clamp comprising:
      a first branch, comprising:
         a middle portion pivotally coupled to a first pivot point of the latch body;
         a first fang at a distal end of the first branch; and
         a first pinch plate at a proximal end of the first branch; and
      a second branch, comprising:
         a middle portion pivotally coupled to a second pivot point of the latch body;
         a second fang at a distal end of the second branch; and
         a second pinch plate at a proximal end of the second branch;
      wherein the connector latch attached together with the cable assembly and the first branch and the second branch are sized and oriented to engage, with the first fang and the second fang, a far edge of the motherboard I/O connector
      wherein the first branch and the second branch both include an L-shaped structure, coupled between the middle portion and the pinch plate, oriented wherein the first and second pinch plates are closer together than the middle portion of the first branch and middle portion of the second branch when the clamp is unbiased.

2. The connector latch of claim 1, wherein the first branch and the second branch are configured to disengage the far edge of the motherboard I/O connector when the clamp is biased by forcing the first pinch plate and the second pinch plate towards each other.

3. The connector latch of claim 1, wherein the first branch includes a first stem extending between the first pivot point and the middle portion.

4. The connector latch of claim 1, wherein the latch body includes a substantially rectangular body core.

5. The connector latch of claim 4, wherein the latch body includes cat ear structures including a first ear extending from the latch body core at the first end of the latch body and a second ear extending from the latch body core at the second end of the latch body.

6. The connector latch of claim 1, wherein the motherboard I/O connector comprises a serial ATA (SATA) connector and wherein the cable assembly is configured to couple a solid state drive to the SATA connector.

7. An information handling system including:
   a motherboard including:
      a central processing unit; and
      an I/O connector;
   a data storage device;
   a cable assembly suitable for connecting to the I/O connector to couple the data storage device to the central processing unit; and
   a connector latch configured to prevent separation of the I/O connector and the cable assembly, wherein the connector latch comprises:
      a latch body wherein a width of the latch body accommodates a width of the cable assembly;
      a retention clip comprising:
         a first tab at a first end of the latch body, extending perpendicularly from the latch body and terminating in a first flange displaced from the latch body by a tab displacement approximately equal to a thickness of the cable assembly; and
         a second tab at a second end of the latch body, extending perpendicularly from the latch body and terminating in a second flange displaced from the latch body by the tab displacement; and
      a clamp comprising:
         a first branch, comprising:
            a middle portion pivotally coupled to a first pivot point of the latch body;
            a first fang at a distal end of the first branch; and
            a first pinch plate at a proximal end of the first branch; and
         a second branch, comprising:
            a middle portion pivotally coupled to a second pivot point of the latch body;
            a second fang at a distal end of the second branch; and
            a second pinch plate at a proximal end of the second branch;
         wherein the connector latch attached together with the cable assembly and the first branch and the second branch are sized and oriented to engage, with the first fang and the second fang, a far edge of the motherboard I/O connector;
         wherein the first branch and the second branch both include an L-shaped structure, coupled between the middle portion and the pinch plate, oriented wherein the first and second pinch plates are closer together than the middle portion of the first branch and middle portion of the second branch when the clamp is unbiased.

8. The information handling system of claim 7, wherein the first branch and the second branch are sized and oriented to disengage the far edge of the I/O connector when biased by forcing the first pinch plate and the second pinch plates towards each other.

9. The information handling system of claim 7, wherein the first branch includes a first stem extending between the first pivot point and the middle portion.

10. The information handling system of claim 7, wherein the first fang and the second fang are closer together than the middle portion of the first branch and the middle portion of the first branch when the clamp is unbiased.

11. The information handling system of claim 7, wherein the latch body includes cat ear structures including a first ear extending from a substantially rectangular latch body core at the first end of the latch body and a second ear extending from the latch body core at the second end of the latch body.

12. The information handling system of claim 7, wherein the data storage device comprises a solid state drive.

13. The information handling system of claim 12, wherein the solid state drive comprises an M.2 solid state drive.

14. The information handling system of claim 13, wherein the I/O connector comprises a serial ATA connector.

15. An apparatus for use in an information handling system, the apparatus comprising:
 a cable assembly including a cable connector suitable for connecting to an I/O connector of a motherboard; and
 a connector latch configured to prevent separation of the I/O connector and the cable connector, wherein the connector latch comprises:
  a latch body wherein a width of the latch body accommodates a width of the cable assembly;
  a retention clip comprising:
   a first tab at a first end of the latch body, extending perpendicularly from the latch body and terminating in a first flange displaced from the latch body by a tab displacement approximately equal to a thickness of the cable assembly; and
   a second tab at a second end of the latch body, extending perpendicularly from the latch body and terminating in a second flange displaced from the latch body by the tab displacement; and
  a clamp comprising:
   a first branch, comprising:
    a middle portion pivotally coupled to a first pivot point of the latch body;
    a first fang at a distal end of the first branch; and
    a first pinch plate at a proximal end of the first branch; and
   a second branch, comprising:
    a middle portion pivotally coupled to a second pivot point of the latch body;
    a second fang at a distal end of the second branch; and
    a second pinch plate at a proximal end of the second branch;
   wherein the first branch and the second branch are sized and oriented to engage, with the first fang and the second fang, a far edge of the motherboard I/O connector
   wherein the connector latch attached together with the cable assembly and the first branch and the second branch are sized and oriented to engage, with the first fang and the second fang, a far edge of the motherboard I/O connector;
   wherein the first branch and the second branch both include an L-shaped structure, coupled between the middle portion and the pinch plate, oriented wherein the first and second pinch plates are closer together than the middle portion of the first branch and middle portion of the second branch when the clamp is unbiased.

16. The apparatus of claim 15, wherein the latch body includes:
 a substantially rectangular body core; and
 cat ear structures including a first ear extending from the latch body core at the first end of the latch body and a second ear extending from the latch body core at the second end of the latch body.

* * * * *